(12) United States Patent
Shoen

(10) Patent No.: US 9,580,112 B2
(45) Date of Patent: Feb. 28, 2017

(54) WORK VEHICLE

(71) Applicant: Kubota Corporation, Osaka-shi (JP)

(72) Inventor: Shigeo Shoen, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/813,492

(22) Filed: Jul. 30, 2015

(65) Prior Publication Data

US 2016/0031486 A1 Feb. 4, 2016

(30) Foreign Application Priority Data

Jul. 31, 2014 (JP) .................................. 2014-156270

(51) Int. Cl.
*B62D 25/12* (2006.01)
*B60K 11/04* (2006.01)
*B60K 13/02* (2006.01)

(52) U.S. Cl.
CPC .............. *B62D 25/12* (2013.01); *B60K 11/04* (2013.01); *B60K 13/02* (2013.01); *B60Y 2200/221* (2013.01)

(58) Field of Classification Search
CPC ........ B60K 13/02; B60K 13/06; B60K 11/04; F02M 35/048; F02M 35/161; F02M 35/10013; F02M 35/10091; B62D 25/12
See application file for complete search history.

(56) References Cited

U.S. PATENT DOCUMENTS

| 4,533,012 A | * | 8/1985 | Komoda | B60K 13/02 123/41.49 |
| 6,068,675 A | | 5/2000 | Tsuda et al. | |
| 2006/0006011 A1 | * | 1/2006 | Khouw | B60K 13/02 180/68.3 |

FOREIGN PATENT DOCUMENTS

| JP | 1178987 A | 3/1999 |
| JP | 1191371 A | 4/1999 |
| JP | 200466891 A | 3/2004 |

* cited by examiner

*Primary Examiner* — Bryan Evans
(74) *Attorney, Agent, or Firm* — The Webb Law Firm

(57) ABSTRACT

There is disclosed a work vehicle having an openable/closable hood for covering an engine and a radiator mounted on a vehicle body frame, an air cleaner having an intake pipe and an elastic body for closing a gap present around the intake pipe. The elastic body includes a radiator side first elastic portion, a hood side second elastic portion and an engaging portion for engaging and retaining the second elastic portion to the first elastic portion. Under a closed state of the hood, the engaging portion maintains the second elastic portion under the engaged state, and the elastic body maintains the intake pipe at a predetermined position and closes the gap.

7 Claims, 9 Drawing Sheets

WORK VEHICLE

CROSS-REFERENCE TO RELATED APPLICATION

This application claims priority to Japanese Patent Application No. 2014-156270 filed Jul. 31, 2014, the disclosure of which is hereby incorporated in its entirety by reference.

BACKGROUND OF THE INVENTION

1. Field of the Invention

The present invention relates to a work vehicle, more particularly, to an engine section of a work vehicle. It is understood, however, that the present invention is not limited thereto.

2. Description of the Related Art

According to a known engine section for a work vehicle noted above, a radiator and a cooling fan are disposed on upstream side in a flowing direction of cooling air to an engine, and upwardly of a shielding plate fixedly disposed at a boundary portion between the radiator and the cooling fan, a recessed portion is formed for defining a space relative to a hood for allowing passage of an intake pipe of an air cleaner. A sealing member is bonded to an inner face of the hood for sealing a gap formed between the shielding plate and the hood. In operation, while the cooling air prior to its passage by the radiator is supplied to the engine via the air cleaner, the arrangement prevents entry of the cooling air after its passage by the radiator to be mixed with the cooling air prior to its passage by the radiator, through e.g. the gap between the shielding plate and the hood such as the space allowing passage of the intake pipe, so that reduction in cooling effect due to the mixing thereof with the cooling air before its radiator passage is prevented (see e.g. JP11-078987A, or US606875A corresponding thereto).

With the above-described arrangement, since the sealing member is bonded to the inner face of the hood, this sealing member, under a closed state of the hood, is to provide its sealing effect as coming into contact with the intake pipe of the air cleaner which passes through the space between the recessed portion of the shielding plate and the hood.

Therefore, it is not possible to visually check whether this sealing member is providing its effect to the air cleaner intake pipe appropriately or not. When it is not functioning appropriately, the cooling air with elevated temperature after its passage by the radiator will flow through the gap between the air cleaner intake pipe and the sealing member to be mixed inadvertently with the cooling air prior to passage by the radiator, so that this mixing may invite reduction in the cooling efficiency.

The object of the present invention is to prevent reliably such reduction of cooling efficiency due to mixing of heated cooling air having passed by the radiator with cooling air prior to radiator passage, via a gap present around an intake pipe of an air cleaner in space where this intake pipe extends through.

SUMMARY OF THE INVENTION

A work vehicle comprising:
a vehicle body frame;
an engine and a radiator which are mounted on the vehicle body frame;
a hood switchable between a closed state for covering the engine and the radiator and an opened state for opening the engine and the radiator to the outside;
an air cleaner having an intake pipe, the intake pipe extending through a space formed between the hood and the radiator when the hood is under the closed state; and
an elastic body closing a gap around the intake pipe in said space when the hood is under the closed state;
wherein the elastic body includes:
a first elastic portion fixed to the radiator,
a second elastic portion disposed closer to the hood than the first elastic portion, the second elastic portion being switchable between an engaged state in which the second elastic portion surrounds the intake pipe in cooperation with the first elastic portion and an engagement released state in which the intake pipe is opened to the outside, and
an engaging portion for engaging and maintaining the second elastic portion under the engaged state; and
wherein under the closed state of the hood, the engaging portion maintains the second elastic portion under the engaged state, and the elastic body maintains the intake pipe at a predetermined position and closes said gap.

With the above-described arrangement, under the opened state of the hood, the second elastic portion ("hood side elastic portion") will be switched to the opened state and the intake pipe of the air cleaner will be paced on the first elastic portion ("radiator side elastic portion") which is fixed at the predetermined position on the radiator side. Thereafter, the second elastic portion will be switched into the closed state and this closed state will be maintained by engagement with the engaging portion. In this way, the elastic body can be fitted on the air cleaner intake pipe while the hood is maintained under the opened state; and also, the air cleaner intake pipe can be fixed and maintained at the predetermined position of the engine section.

The above arrangement provides ability of visual check for presence/absence of gap between the air cleaner intake pipe and the elastic body fitted on this intake pipe. And, if gap exists, an appropriate measure such as closing this gap can be carried out in a reliable manner. As a result, it is possible to reliably avoid mixing of heated cooling air having passed by the radiator with the cooling air before radiator passage via a gap formed between the air cleaner intake pipe and the elastic body, so that reduction of cooling efficiency due to such mixing can be prevented reliably.

Further, when the hood is to be rendered into the closed state, inadvertent positional displacement of the air cleaner intake pipe from its appropriate position relative to the elastic body can be avoided. Consequently, formation of a gap between the air cleaner intake pipe and the elastic body due to such positional displacement can be prevented.

And, when the hood is rendered into the closed state, the elastic body appropriately fitted on the air cleaner intake pipe can close reliably the gap around the intake pipe in the space for intake pipe extension/passage formed between the closed hood and the radiator.

As a result, it is possible to reliably avoid the risk of heated cooling air after radiator passage passing through such gap around the intake pipe in the space for intake pipe extension/passage formed between the closed hood and the radiator to be inadvertently mixed with cooling air before radiator passage, so that cooling efficiency reduction due to such mixing can be prevented in a reliable manner.

According to one preferred embodiment, the first elastic portion and the second elastic portion are formed integrally with each other such that the elastic body may be opened/closed.

With this arrangement, it is possible to avoid missing of the second elastic portion which could occur in the case of conceivable arrangement in which the first and second elastic portions of the elastic body are configured to be entirely separable from each other.

According to one preferred embodiment, the engaging portion includes a first projecting part which projects from the first elastic portion toward the second elastic portion in a direction perpendicular to an opening/closing direction of the second elastic portion and an inserting direction of the intake pipe, and a second projecting part which projects from the second elastic portion toward the first elastic portion in the direction perpendicular to the opening/closing direction of the second elastic portion and the inserting direction of the intake pipe;

the first projecting part and the second projecting part are offset in position in the opening/closing direction of the second elastic portion; and when the second elastic portion is under the engaged state, the second projecting part projects more on downstream side than the first projecting part in the closing direction of the second elastic portion.

With the above-described arrangement, in comparison with a conceivable arrangement of the engaging portion being configured as a separate member which is detachably attachable to the first elastic portion and the second elastic portion respectively, it is possible to achieve e.g. simplification and cost reduction of arrangement through reduction in the number of components.

Further, under the closed state of the second elastic portion, the second projecting part of this second elastic portion projects more on downstream side in the closing direction of the second elastic portion relative to the first projecting part of the first elastic portion, whereby with utilization of the elasticity of the second projecting part, the second elastic portion can be placed in close and tight contact with the air cleaner intake pipe and also this air cleaner intake pipe can be placed in close and tight contact with the first elastic portion.

Consequently, together with e.g. simplification of the configuration of the elastic body, the risk of heated cooling air having passed by the radiator being inadvertently mixed with cooling air before radiator passage through the gap between the air cleaner intake pipe and the elastic body can be avoided in a reliable manner, thus preventing the cooling efficiency reduction due to such mixing reliably.

According to one preferred embodiment, the engaging portion includes a convex portion formed in one of the first elastic portion and the second elastic portion and a concave portion formed in the other one of the first elastic portion and the second elastic portion.

With the above-described arrangement, in comparison with conceivable arrangement of forming the engaging portion as a separate member detachably attached to the first elastic portion and the second elastic portion, it is possible to achieve e.g. simplification and cost reduction of arrangement through reduction in the number of components.

According to one preferred embodiment, the work vehicle further comprises:

a cooling fan;

a fan shroud extending from the radiator to the cooling fan;

wherein the fan shroud includes an extension portion extending from the radiator to the hood, the extension portion having a recessed part forming said space between the extension portion and the hood; and the first elastic portion of the elastic body is fixed to a circumferential portion of the recessed part in the fan shroud.

With the above-described arrangement, positional alignment of the air cleaner intake pipe passing through the space formed by the hood and the recessed part of the fan shroud, with the elastic body for fixing the radiator side elastic portion to the circumferential portion of the recessed part of the fan shroud, can be carried out more easily.

Consequently, the fixing maintenance of the intake pipe at the predetermined position by the elastic body and the closing of the gap around the intake pipe in the space for intake pipe passage by the elastic body can be implemented easily and favorably.

The other characterizing features and advantageous effects resulting therefrom will become apparent upon reading the following description with reference to the accompanying drawings.

DETAILED DESCRIPTION OF THE PREFERRED EMBODIMENTS

A work vehicle relating to the present invention, particularly its engine section, will be described hereinafter with reference to its embodiment applied to a tractor as an example of the work vehicle. In the following description, unless indicated explicitly otherwise, a direction along a straight traveling direction of the tractor will be referred to as "fore/aft direction", a direction perpendicular on right and left sides to the "fore/aft direction" will be referred to as "right/left direction" and a vertical direction perpendicular to the "fore/aft direction" and the "right/left direction" will be referred to as "vertical direction", respectively.

Figure 1:
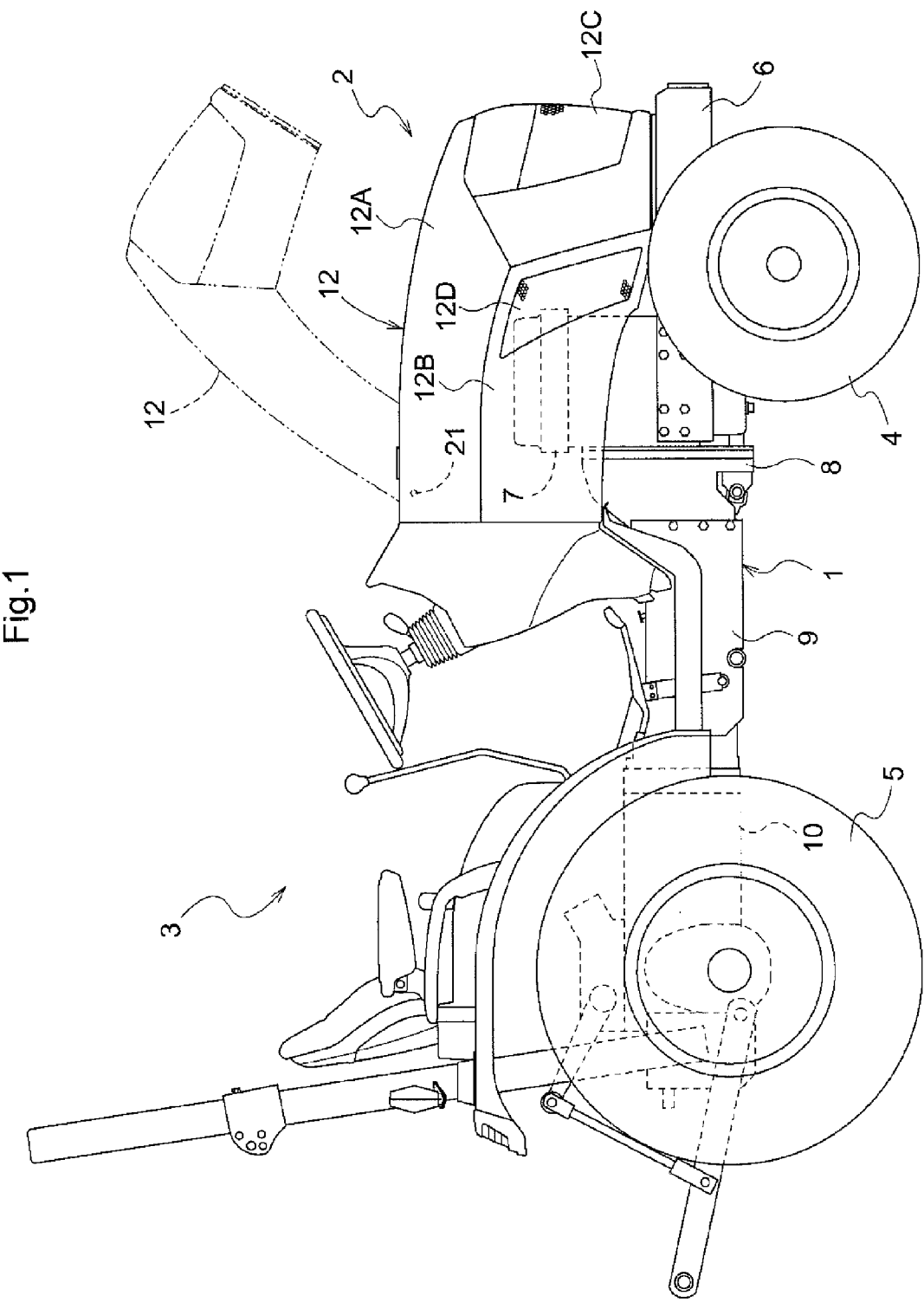
FIG. 1 is a right side view showing a tractor as an example of work vehicle according to one embodiment of the present invention (this embodiment being also shown in the figures thereafter up to FIG. 12)

As shown in FIG. 1, a tractor illustrated in this embodiment includes an engine section 2 mounted at a front half portion of a vehicle body frame 1, and a riding driving section 3 mounted at a rear half portion of the vehicle body frame 1. And, on the right and left sides of the engine section 2, there are disposed front wheels 4 as drivable steerable wheels; and on the right and left sides of the riding driving section 3, there are disposed rear wheels 5 as drivable wheels which can be braked. Thus, this tractor is configured as a four-wheel drive type.

Figure 2:
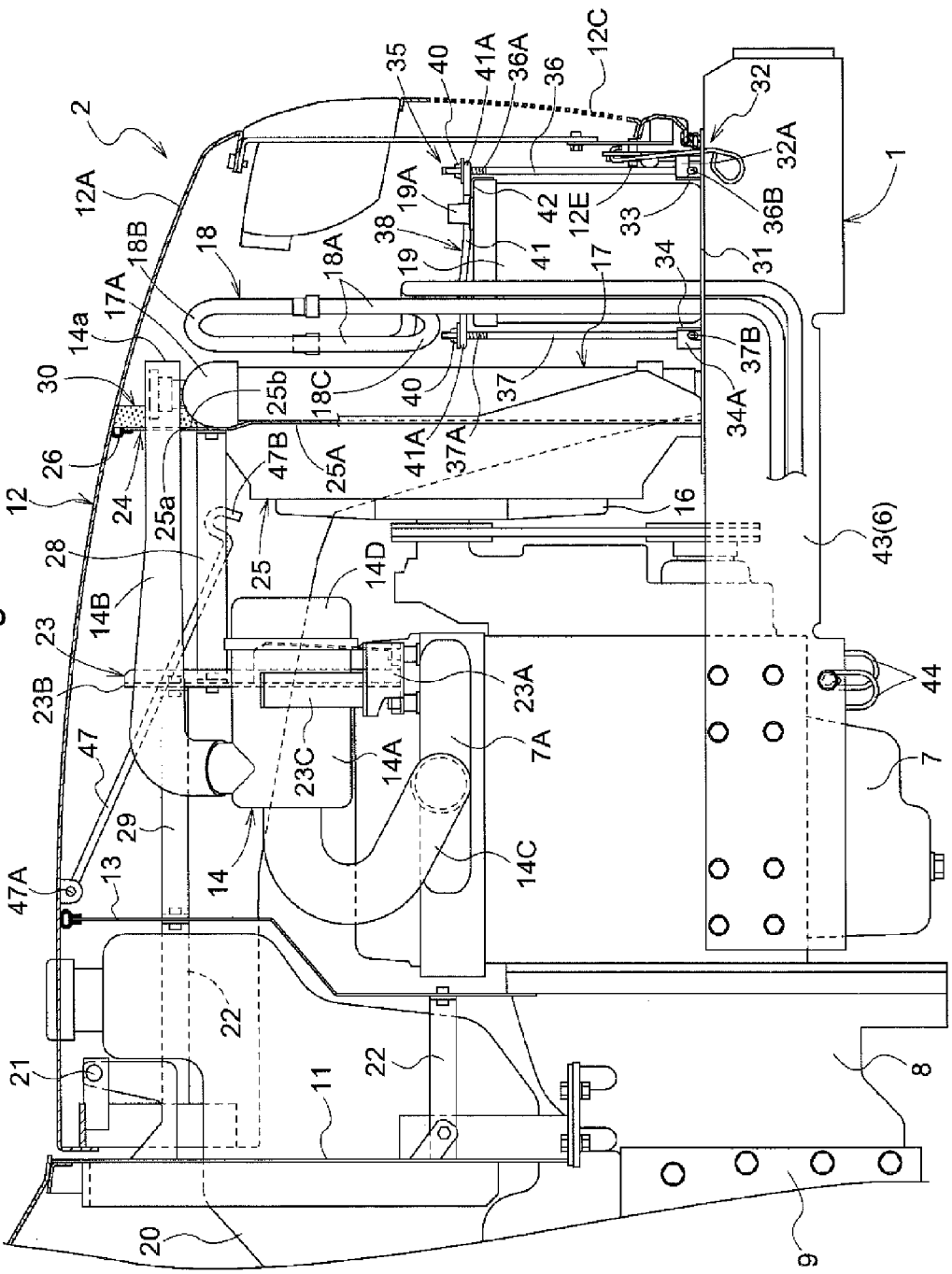
FIG. 2 is a right side view in vertical section showing a configuration of an engine section.

As shown in FIG. 1 and FIG. 2, the vehicle body frame 1 consists of such components as a front frame 6 forming its front side part, a water-cooled engine 7 connected to a rear portion of the front frame 6, a clutch housing 8 connected to a rear lower portion of the engine 7, an intermediate frame 9 connected to a rear portion of the clutch housing 8, a transmission case 10 connected to a rear end portion of the intermediate frame 9, and so on. Further, at the rear end portion of the clutch housing 8, there is mounted erect a support frame 11 having a downwardly oriented U-shape as viewed in the fore/aft direction.

As shown in FIGS. 1 through 5, the engine section 2 includes a hood 12 forming a disposing space for the engine 7, etc. Further, at a position spaced apart by a predetermined distance from the support frame 11 on the front side of the vehicle body, there is mounted erect a heat shielding wall 13 dividing the above disposing space into an engine room on the vehicle body front side and a tank room on the vehicle body rear side. And, in the engine room on vehicle body front side, there are disposed the engine 7, an air cleaner 14 for filtering air which is to be supplied to the engine 7, a muffler 15 as an example of an exhaust gas treating device, a radiator 17 having a cooling fan 16, an oil cooler 18, a battery 19, and so on. Further, in the tank room on the vehicle body rear side, there is disposed a fuel tank 20. And, the cooling fan 16, the radiator 17 and the oil cooler 18, etc. provided in the engine room together constitute a cooling section.

Incidentally, the exhaust gas treating device can be an exhaust gas cleaning device having an oxidizing catalyst, a DPF (Diesel Particulate Filter", etc.

Figure 3:
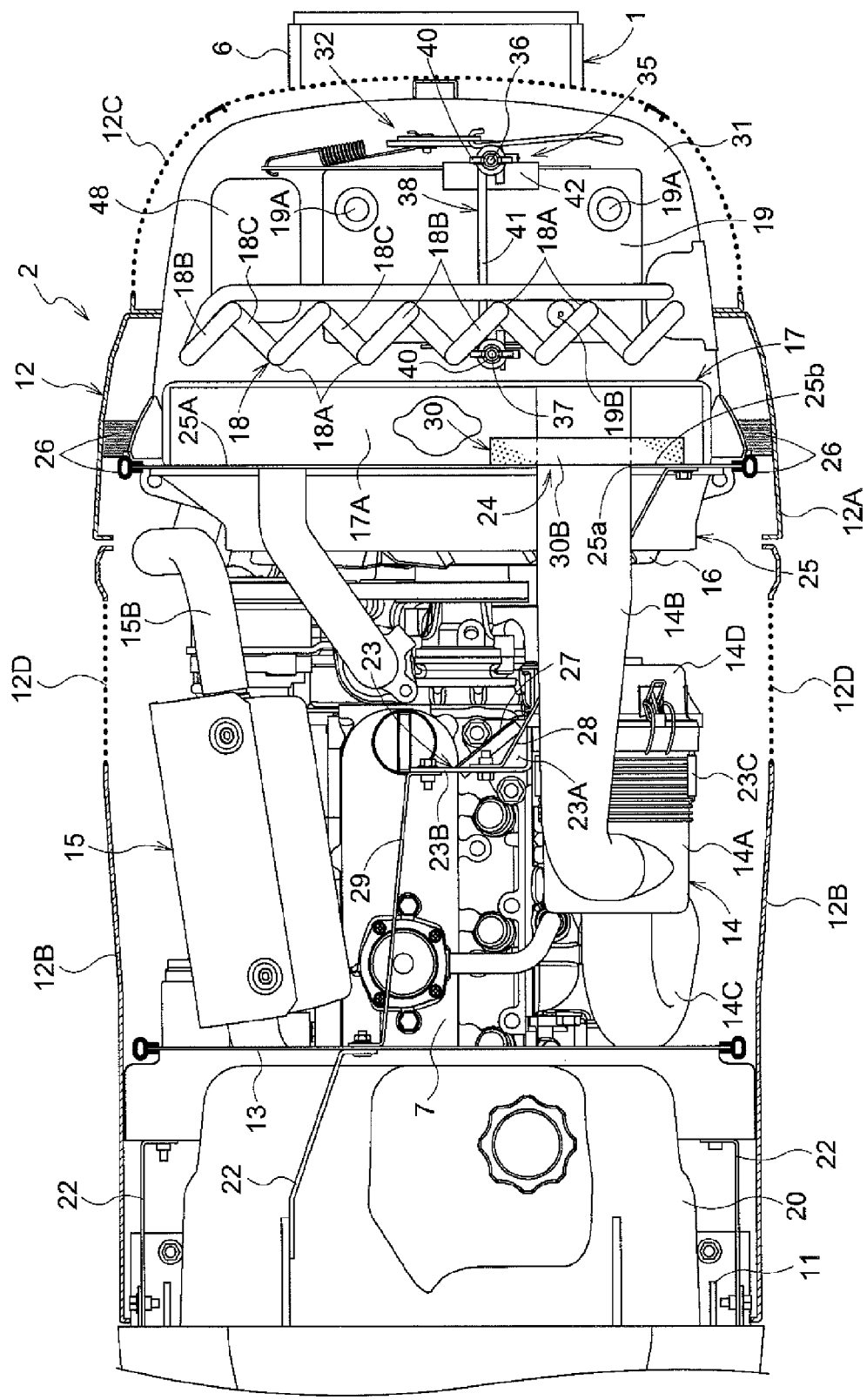
FIG. 3 is a plan view in transverse section showing the configuration of the engine section.

As shown in FIGS. 1 through 3, the hood 12 includes a first cover portion 12A which can be pivotally opened/closed, and right and left second cover portions 12B detachably attachable. The first cover portion 12A is pivotally opened/closed between a closed state for closing/covering the engine 7, the radiator 17, etc. from above and a opened state for opening the engine 7, the radiator 17, etc. to the outside. The hood 12 further includes, at the front end thereof, a front grill 12C as an ambient air introducing portion. The right and left second cover portions 12B include exhaust portions 12D on the respective front sides thereof.

As shown in FIGS. 1 though 4, the engine 7 is disposed at an area in the engine room on the vehicle body rear side spaced from the front grill 12C under a posture with its output shaft (not shown) being oriented along the fore/aft direction. The heat shielding wall 13 is formed of a metal plate bent along the front face of the fuel tank 20 and is connected to the support frame 11 via a plurality of support members 22 extending forwardly from the support frame 11.

The air cleaner 14 and the muffler 15 are disposed side by side along the right/left direction in an upper space in the engine room. More particularly, the air cleaner 14 and the muffler 15 are disposed side by side along the right/left direction in a space in the engine room upwardly of the engine 7.

As shown in FIGS. 2 through 7, the air cleaner 14 is disposed in a right side area in the engine room upwardly of the engine 7 via an air cleaner support member 23 mounted erect upwardly of the engine 7 such that the air cleaner 14 is located at the right/left center of the engine room. And, the air cleaner 14 includes a cleaner body 14A, an ambient air introducing inlet pipe 14B extending from the cleaner body 14A toward the front grill 12C of the hood 12, and a relaying inlet pipe 14C extending from the cleaner body 14A to an intake section 7A of the engine 7.

The ambient air introducing intake pipe 14B extends through a space 24 formed between the hood 12 and the radiator 17. The intake pipe 14B extends from the air cleaner 14$a$ with a length thereof sufficient to dispose an inlet opening 14$a$, defined at its extension end, closer to an ambient air introducing side than the radiator 17. With this arrangement, the inlet pipe 14B is configured to take in an amount of air which is present on more upstream side in a flowing direction of cooling air than the radiator 17.

The relaying inlet pipe 14C is connected to the intake portion 7A of the engine 7 to be pivotally displaceable in the vertical direction relative to its connection portion connected to the intake portion 7A of the engine 7 as a "pivot". With this arrangement, in the air cleaner 14, both the ambient air intake pipe 14B and the relaying intake pipe 14C can be vertically pivotable or displaceable between a supported position supported by the air cleaner support member 23 and a released position releasing the support by the air cleaner support member 23. And, an arrangement is provided such that when the air cleaner 14 is located at the supported position, the ambient air inlet pipe 14B extends into the space 24 between the hood 12 and the radiator 17; and further that when the air cleaner 14 is located at the released position, the ambient air introducing inlet pipe 14B extends upwardly away from the space 24 between the hood 12 and the radiator 17.

Figure 4:
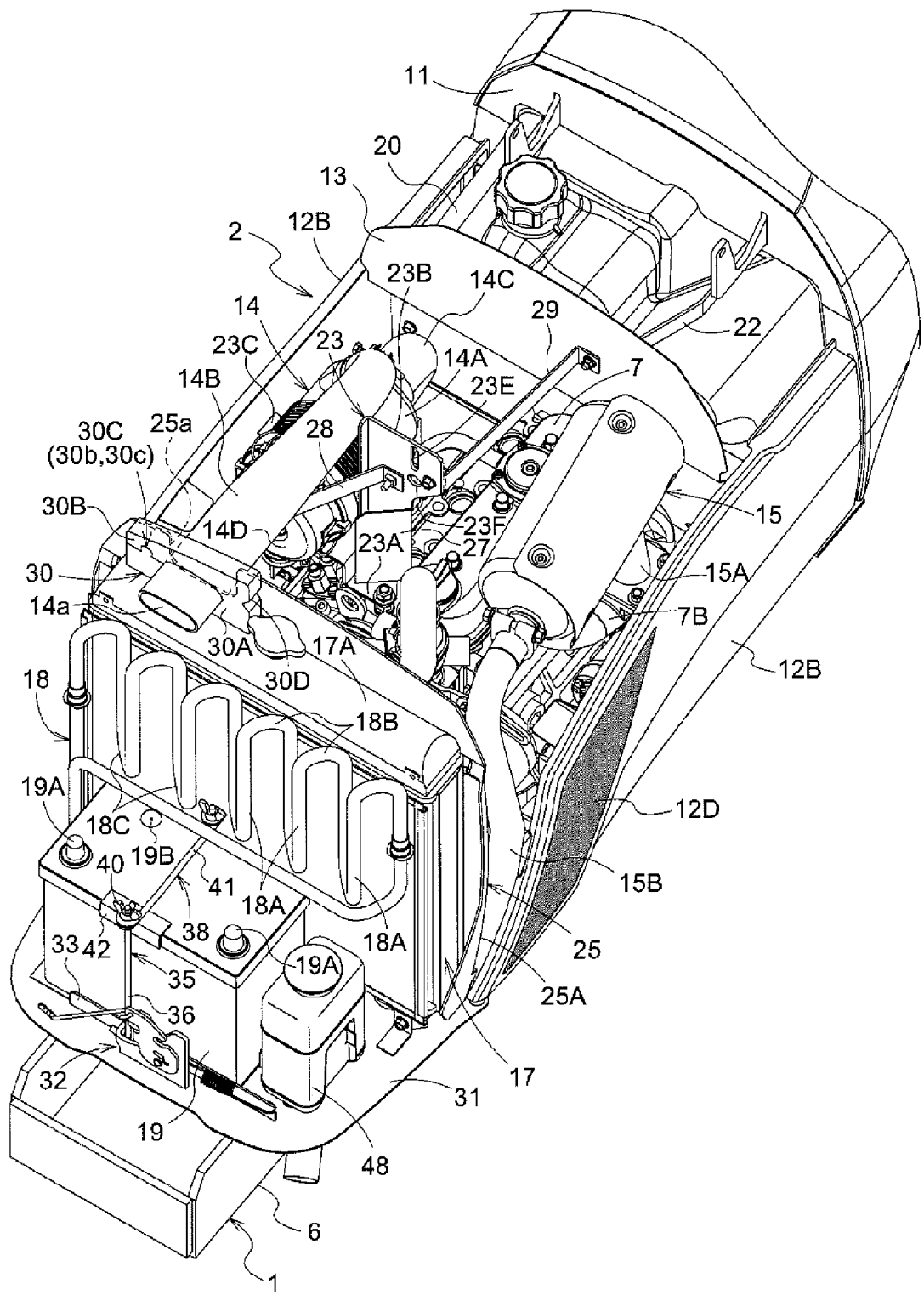
FIG. 4 is a perspective view showing the configuration of the engine section.

As shown in FIG. 3 and FIG. 4, the muffler 15 includes a relaying exhaust pipe 15A extending from the exhaust section 7B of the engine 7 to the muffler 15 and an exhausting exhaust pipe 15B extending from the muffler 15 toward a left outer portion of the front frame 16. And, via the relaying exhaust pipe 15A acting also as a support member, the muffler 15 is disposed in a left region in the space upwardly of the engine in the engine room.

Figure 7:
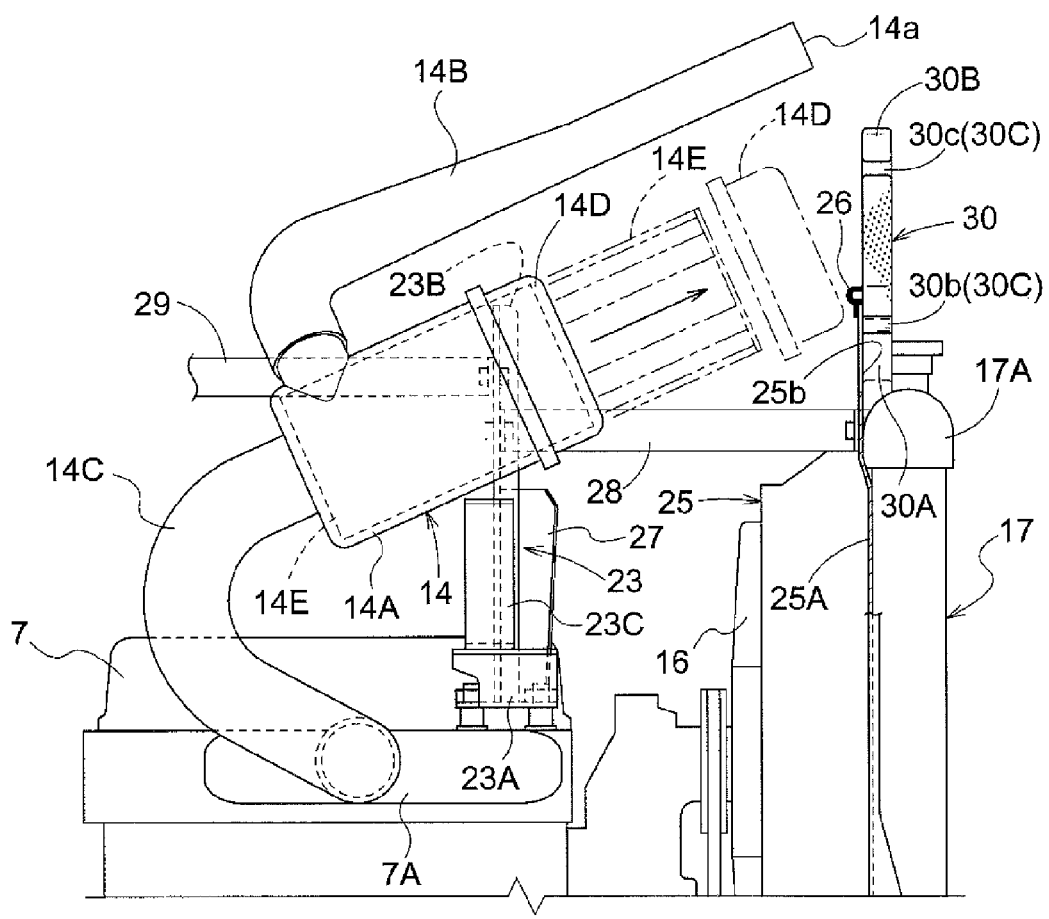
FIG. 7 is a right side view in vertical section of principal portions illustrating an element replacement condition of an air cleaner.

As shown in FIG. 2, FIG. 3 and FIG. 7, the cooling fan 16 is disposed at a position on the front side of the vehicle body which is on more upstream side in the flowing direction of cooling air than the engine 7 in the engine room. And, as the cooling fan 16 is driven to rotate to the right in its front view by power from the engine 7, there is generated a cooling air which flows in a stable manner from the front grill 12C of the hood 12 toward the engine 7. Also, the cooling fan 16 causes cooling air after being used for cooling to flow to the outside of the vehicle via e.g. the exhaust portions 12D of the hood 12, right and left gaps formed between the vehicle body frame 1 and the hood 12 at a rear side lower portion of the engine section 2, etc.

As shown n FIGS. 2 through 7, the radiator 17 is mounted erect at a position on the front side of the vehicle body which is on the upstream side in the flowing direction of the cooling air to the engine 7. Specifically, the radiator 17 is disposed under a vertical posture at a position more forwardly than the engine 7 and the cooling fan 16 in the engine room. The radiator 17 cools engine cooling water by using the cooling air from the front grill 12C. And, for the sake of improvement in its cooling efficiency, there is provided a fan shroud 25 extending from the radiator 17 to the cooling fan 16.

The fan shroud 25 includes an extension portion 25A extending from the radiator to the hood 12. And, at a right upper portion of the extension portion 25A, the fan shroud 25 has a recessed part 25a for forming the space 24 between the extension portion 25A and the hood 12 through which the above-described ambient air introducing intake pipe 14B is caused to pass. Further, at extension ends of the extension portion 25A excluding the recessed part 25a, there are provided trimmed portions 26 which come into tight contact with the inner face of the hood 12 under its closed state.

As shown in FIGS. 2 through 5, the oil cooler 18 includes a plurality of vertically oriented pipe portions 18A forming vertically oriented flow passages, a plurality of upper pipe portions 18B forming flow passages between upper ends of two adjacent vertically oriented pipe portions 18A, and a plurality of lower pipe portions 18C forming flow passages between lower ends of two adjacent vertically oriented pipe portions 18A, so that there is formed one continuous vertically meandering flow passage for heat exchange. Further, the oil cooler 18 has a vertical width corresponding to a vertical length of an upper half portion of the radiator 17, and a horizontal width extending over the entire right/left width of the radiator 17. And, the oil cooler 18 is disposed on the upstream side in the flowing direction of cooling air relative to the radiator 17. More specifically, the oil cooler 18 is disposed in opposition to the upper half portion of the radiator 17 at a position on more front side of the vehicle body than the radiator 17 in the engine room. And, the oil cooler 18 is configured to cool oil used for a hydraulic stepless speed changer device (not shown) provided as a main speed changer device of the tractor by means of cooling air which flows from the radiator 12C of the hood 12 toward the upper half portion of the radiator 17.

The battery 19, together with the oil cooler 18, is disposed on the upstream side in the flowing direction of cooling air to the radiator 17. More specifically, the battery 19 is disposed in opposition to the lower half portion of the radiator 17 at a position on more front side of the vehicle body than the radiator 17 in the engine room.

As shown in FIGS. 2 through 4, the fuel tank 20 extends into a space formed by the clutch housing 8, the downwardly oriented U-shaped support frame 11, etc., and the fuel tank 20 has its connecting portions (not shown) provided on the right and left sides thereof connected to the support frame 11.

As shown in FIGS. 2 through 4 and FIG. 7 and FIG. 8, the support member 23 for supporting the air cleaner 14 includes a connecting portion 23A bolt-connected to the upper end of the engine 7, a raised portion 23B extending upwards from the connecting portion 23A between the air cleaner 14 and the muffler 15, and a U-shaped holding portion 23C extending from the raised portion 23B toward the air cleaner 14. With the holding portion 23C, the air cleaner 14 is clamped and held with allowing upwardly removing operation thereof relative to the holding portion 23C. Further, a vane plate 27 is provided for guiding a portion of the cooling air flowing through the engine room toward the support member 23, so that this cooling air portion may reach the muffler 15. The vane plate 27 is mounted erect on the vehicle body front side which is more on the upstream side of the flowing direction of cooling air than the raised portion 23B of the connecting portion 23A, so that this vane plate 27 may be positioned between the front portion of the air cleaner 14 and the front portion of the muffler 15. And, the posture of the vane plate 27 as seen in its front view is set as a left-rearwardly inclined posture so that the vane plate 27 may be located progressively more rearward on its left side.

With the above-described arrangement, cooing air directed toward the support member 23 which need not positively be cooled can be fed instead to the muffler 15 which need be positively cooled for restricting temperature rise. As a result, cooling of the muffler 15 can be carried out more effectively.

Further, by the function of the vane plate 27, in the area on the vehicle body rear side from the cooling fan 16 at the upper portion of the engine room, cooling air from the cooling fan 16 can be caused to flow to the left side as seen in the front view. With this, hot air which tends to be stagnated at e.g. the space upwardly of the engine 7 can be caused to flow to the outside of the vehicle body via e.g. the exhaust portions 12D of the hood 12. Consequently, cooling of the engine 7 and the muffler 15 and so on can be carried out in a more effective manner.

The air cleaner support member 23 and the radiator 17 are connected to each other via a first connecting member 28 formed as a band-like steel plate member extending therebetween. The first connecting member 28, placed under a vertical posture to define its width direction oriented vertically, extends obliquely across the space on the side of the air cleaner 14 between the upper side of the support member 23 and a right end portion of an upper tank 17A of the radiator 17.

That is, the supporting strength of the air cleaner support member 23 and the radiator 17 can be enhanced by the first connecting portion 28 without blocking the flow of cooling air from the cooling fan 16 to the muffler 15 by the first connecting member 28.

Incidentally, the first connecting portion 28 has its front end portion bolt-connected to a right end portion of the upper tank 17A of the radiator 17, along with the right upper end portion of the fan shroud 25.

The air cleaner support member 23 and the heat shielding wall 13 are connected to each other via a second connecting member 29 formed as a band-like steel plate member extending therebetween. This second connecting member 29, placed under a posture to define its width direction oriented vertically, extends through a apace between the air cleaner 14 and the muffler 15, and from an upper side of the support member 23 to a right/left center portion of the upper portion side of the heat shielding wall 13.

That is, the supporting strength of the air cleaner support member 23 and the heat shielding wall 13 can be enhanced by the second connecting portion 29 without blocking the flow of cooling air from the cooling fan 16 to the muffler 15 by the second connecting member 29.

As shown in FIGS. 2 through 4 and FIG. 7, the air cleaner 14, at its supported position described above, assumes a horizontal posture oriented along the fore/aft direction to extend into between the heat shielding wall 13 and the cooling fan 16. And, a cover member 14D detachably attached to a front end portion of its air cleaner body 14A is disposed in opposition to the cooling fan 16 and the fan shroud 25. Further, at its released position also described above, the air cleaner 14 assumes a forwardly raised inclined posture, so that the cover member 14D is disposed upwardly away from between the heat shielding wall 13 and the cooling fan 16 and is oriented toward the upper sides of the cooling fan 16 and the fan shroud 25.

That is, when the air cleaner 14 is pivotally switched from the supported position to the released position, the cover member 14D can be detached from the cleaner body 14A. And, with this detachment, an element 14E detachably mounted in the cleaner body 14A is made ready for replacement.

As shown in FIGS. 2 through 7, the engine section 2 includes an elastic body 30 configured to close a gap around an ambient air introducing intake pipe 14B in the space 24 through which the intake pipe 14B is caused to pass. The elastic body 30 employs rubber, polyurethane or the like as its material and is provided in the form of sponge having relatively high shape-retaining property. The elastic body 30 includes: a radiator side elastic portion (an example of "first elastic portion") 30A fixed to the radiator side; a hood side elastic portion (an example of "second elastic portion") 30B which is switchable between a closed state (an engaged state) in which the hood side elastic portion 30B surrounds the ambient air introducing intake pipe 14B in cooperation with the radiator side elastic portion 30A, and an opened state (an engagement released state) in which the ambient air introducing intake pipe 14B is opened to the outside; and an engaging portion 30C for engaging and maintaining the hood side elastic portion 30B under the above-described closed state (engaged state).

The radiator side elastic portion 30A has a U-shape having a concave portion 30a which is smaller than the recessed part 25a of the fan shroud 25. And, the radiator side elastic portion 30A is fixed as being bonded to a circumferential portion 25b of the recessed part 25a in the extension portion front end face of the fan shroud 25.

The hood side elastic portion 30B is formed integral with the radiator side elastic portion 30A to be capable of pivotally opening/closing. And, a horizontally oriented V-shaped cutout portion 30D is formed at an outer portion of the left end bridging between the radiator side elastic portion 30A and the hood side elastic portion 30B, thus allowing smooth pivotal switchover of the hood side elastic portion 30B from the closed state to the opened state without inviting pivotal deformation. Further, the elasticity of the hood side elastic portion 30B aids returning from the opened state to the closed state of the hood side elastic portion 30B. And, under its closed state, the hood side elastic portion 30B, in cooperation with the radiator side elastic portion 30A, is fitted on the ambient air introducing intake pipe 14B in tight (gapless) contact with the intake pipe 14B. Further, as the hood side elastic portion 30B extends between the right and left trimmed portions 26 disposed on the right and left sides thereof, the hood side elastic portion 30B functions as a sealing member for sealing/closing a gap relative to the hood 12.

The engaging portion 30C is comprised of a convex portion 30b formed at the right end portion of the radiator side elastic portion 30A and a concave portion 30c formed at the free end portion of the hood side elastic portion 30B. The convex portion 30b has an Ω (omega) shape as seen in the fore/aft direction and bulges upwards from the right end portion of the radiator side elastic portion 30A. The concave portion 30c has an Ω (omega) shape as seen in the fore/aft direction, and the concave portion 30c is recessed upwards from the lower face of the free end portion of the hood side elastic portion 30B.

With the above-described arrangement, after the first cover portion 12A of the hood 12 is switched to the opened state, the engagement holding of the hood side elastic portion 30B under its closed state by the engaging portion 30C will be released to switch the hood side elastic portion 30B into the opened state. With this, the ambient air introducing intake pipe 14B of the air cleaner 14 can now be removed upwards from the concave portion 30a of the radiator side elastic portion 30A. This allows the above-described pivotal displacement of the air cleaner 14 from the support position to the released position. And, to the clear cleaner 14 at its released position, a maintenance operation such as replacement of the element 14E of the cleaner 14 can be effected.

Thereafter, the ambient air introducing intake pipe 14B will be placed in the concave portion 30a of the radiator side elastic portion 30A; and then the hood side elastic portion 30B will be rendered into the closed state, and engaged and maintained under this closed state by the engaging portion 30C, whereby the elastic body 30 can be fitted on the ambient introducing intake pipe 14B with keeping the hood 12 under the opened state. Also, the ambient air introducing intake pipe 14B can be fixedly retained at the predetermined position in the engine room.

With the above, it is made possible to visually check presence/absence of any gap which may be between the ambient introducing intake pipe 14B and the elastic body 30 fitted on the intake pipe 14B. If a gap exists, an appropriate measure such as closing the gap can be carried out reliably. As a result, it becomes possible to reliably prevent entry of the heated cooling air that has passed by the radiator 17 into the cooling air prior to cooling the radiator 17, through a gap present between the ambient introducing intake pipe 14B and the elastic body 30; and also prevents reduction of cooling efficiency resulting from the entry of the heated cooling air.

Further, when the first cover portion 12A of the hood 12 is to be switched into the closed state, the risk of the ambient air introducing intake pipe 14B being displaced from its predetermined position inadvertently can be avoided. And, formation of a gap between the ambient air introducing intake pipe 14B and the elastic body 30 resulting from such displacement can be prevented.

And, when the first cover portion 12A of the hood 12 is switched to the closed state, the hood side elastic portion 30B, together with its right and left rimmed portions 26, will come into close and tight contact with the inner face of the hood 12, thus preventing formation of any gap relative to the inner face of the hood 12. Moreover, thanks to the elastic body 30 which can be fitted appropriately on the ambient introducing intake pipe 14B, the gap can be closed in a reliable manner which otherwise could be present around the intake pipe 14B in the ambient air introducing intake pipe inserting space 24 that is formed between the closed first cover portion 12A and the recessed part 25a of the fan shroud 25 provided in the radiator 17.

As a result, it becomes possible to reliably avoid the risk of heated cooling air having passed by the radiator 17 getting mixed inadvertently with cooling air before cooling the radiator 17, via e.g. a gap formed between the closed first cover portion 12A and the recessed part 25a of the fan shroud 25 provided in the radiator 17, thus reliably preventing reduction of cooling efficiency due to such mixing.

And, as the radiator side elastic portion 30A of the elastic body 30 is fixed to the circumferential portion 25b of the recessed part 25a of the fan shroud 25, positional alignment is facilitated between the elastic body 30, and the ambient air introducing intake pipe 14B which extends through the intake pipe passing space 24 formed by the hood 12 and the recessed part 25a of the fan shroud 25. As a result, the fixing maintenance of the ambient air introducing intake pipe 14B by the elastic body 30, and the closing of gap around the intake pipe 14B by the elastic body 30 in the intake pipe passing space 24, can be carried out even more easily and favorably.

As shown in FIGS. 2 through 5, in the oil cooler 18, the plurality of vertically oriented pipe portions 18A are arranged such that the disposing direction of the vertically oriented pipe portions 18A connected in series by the upper pipe portions 18B is made different from the disposing direction of the vertically oriented pipe portions 18A connected in series by the lower pipe portions 18C, and also such that each upper pipe portion 18B assumes a different inclined posture relative to the radiator 17 as seen in the plan view, from each lower pipe portion 18C.

More particularly, the plurality of vertically oriented pipe portions 18A are disposed in a zigzag pattern in two front and rear rows. And, each upper pipe portion 18B assumes a left rearwardly oriented inclined posture as viewed in the plan view between the vertically oriented pipe portion 18A in the front row and the vertically oriented pipe portion 18A in the rear row disposed on its left rear side. Further, each lower pipe portion 18C assumes a right rearwardly oriented inclined posture as viewed in the plan view between the vertically oriented pipe portion 18A in the front row and the vertically oriented pipe portion 18A in the rear row located on the right rear side thereof. And, with these, the oil cooler 18 is bent to have one long flow passage continuous in a meandering pattern along the vertical direction as well as the fore/aft direction of the vehicle body.

With the above, the vertical length of the oil cooler 18 is made shorter, so that this oil cooler 18 may be disposed in opposition to the upper half portion of the radiator 17 on the upstream side in the flow direction of cooling air to the radiator 17 in the engine room; and at the same time, the oil cooler 18 as a whole can face the front grill 12C, thus increasing the total length of the flow passage in this oil cooler 18.

That is, the oil cooler 18 can be disposed in a compact manner at the portion opposing to the upper half portion of the radiator 17 and at the same time, the cooling air from the front grill 12C can be caused to come into contact with the whole oil cooler 18 in a favorable manner.

Further, for instance, in comparison with a conceivable arrangement of arranging the plurality of vertically oriented pipe portions 18A in one row with a reduced right/left distance therebetween so as to increase the total length of the flow passage in the oil cooler 18 with the oil cooler 18 as a whole being disposed to face the front grill 12C, the above-described arrangement makes it possible to increase the cooling air passage formed between adjacent vertically oriented pipe portions 18A, so that the amount of cooling air passing in such cooling air passage can be increased advantageously.

Consequently, the oil cooling efficiency of the oil cooler 18 by the cooling air from the front grill 12C can be improved.

With effective utilization of the space made available downwardly the oil cooler 18 by the arrangement of disposing the oil cooler 18 in opposition to the upper half portion of the radiator 17, the battery 19 is disposed in opposition to the lower half portion of the radiator 17 as extending to the lower side of the oil cooler 18 so as to be overlapped with this oil cooler 18 as seen in the plan view.

With the above-described arrangement, for instance, in comparison with a conceivable arrangement of disposing the oil cooler 18 in opposition on the vehicle body front side which is the upstream side in the flow direction of the cooling air to the radiator 17 in the engine room and disposing the battery 19 in opposition on the vehicle body front side which is the upstream side in the flow direction of cooling air to this oil cooler 18, the above-described arrangement allows advantageous reduction in the front/rear length of the engine section 2, which in turn allows advantageous reduction in the total length of the tractor. Further, the above arrangement allows also avoidance of blocking of cooling air from the front grill 12C toward the oil cooler 18 by the presence of the battery 19. Thus, reduction in the cooling efficiency of the oil cooler 18 due to certain arrangement of the battery 19 can be prevented.

As shown in FIGS. 2 through 5, FIG. 9, FIG. 10A and FIG. 10B, the front frame 6 includes, at its front half upper portion, a support deck 31 formed of metal plate for supporting thereon the radiator 17 and the battery 19. This support deck 31 includes a holding mechanism 32 for allowing holding/maintaining of the hood 12 under its closed state, a front-side receiving member 33 for receiving a front lower portion of the battery 19 and preventing positional displacement of the battery 19 toward the vehicle body front side, a rear-side receiving member 34 receiving a rear lower portion of the battery 19 and prevent positional displacement of the battery 19 toward the vehicle body rear side, and a fixing tool 35 allowing fixed retention of the battery 19.

The fixing tool 35 includes a font-side vertically oriented rod 36 having a lower end portion thereof detachably engageable with an engaged portion 32A of the holding mechanism 32 continuously connected to the front-side receiving member 33, a rear-side vertically oriented rod 37 having a lower end portion thereof detachably engageable with the rear-side receiving member 34, a pressing member 38 detachably attached to and extending between the front-side vertically oriented rod 36 and the rear-side vertically oriented rod 37, front and rear washers 39 fitted to the vertically oriented rod 36, 37 corresponding thereto, and front and rear wing nuts 40 threaded to an upper portion of the vertically oriented rod 36, 37 corresponding thereto. With these components thereof, the fixing tool 35 fixes the battery 19 to the vehicle body in such a manner that the tool 35 strides over the battery 19 in the fore/aft direction of the vehicle body which is the flowing direction of cooling air.

The front-side receiving member 33 is disposed adjacently on the vehicle body rear side of the holding mechanism 32 with a predetermined distance therefrom, with the receiving member 33 allowing engagement of the front-side vertically oriented rod 36 under its raised posture between this front-side receiving member 33 and the holding mechanism 32 and also preventing collapsing or falling of the front-side vertically oriented rod 36 in the fore/aft direction in cooperation with the holding mechanism 32.

The rear-side receiving member 34 is disposed adjacently on the vehicle body front side of the radiator 17 with a predetermined distance therefrom, with the receiving member 34 allowing engagement of the rear-side vertically oriented rod 37 under its raised posture between this rear-side receiving member 34 and the radiator 17 and also preventing collapsing or falling of the rear-side vertically oriented rod 37 in the fore/aft direction in cooperation with the radiator 17.

The front-side vertically oriented rod 36 includes, at its upper end, a threaded portion 36A for the wing nut and further includes, at its lower end, an engaging portion 36B extending to the right. As this engaging portion 36B is fitted between the holding mechanism 32 and the front-side receiving member 33 and then engaged with the engaged portion 32A of the holding mechanism 32 in the lateral direction, the font-side vertically oriented rod 36 can be held erect between the holding mechanism 32 and the front-side receiving member 33, with the rod 36 being detachable therefrom.

The rear-side vertically oriented rod 37 includes, at its upper end, a threaded portion 37A for the wing nut and further includes, at its lower end, an engaging portion 37B extending to the right. As this engaging portion 37B is fitted between the radiator 17 and the rear-side receiving member 34 and then engaged with an engaged portion 34A provided in the rear-side receiving member 34 in the lateral direction, the rear-side vertically oriented rod 37 can be held erect between the radiator 17 and the rear-side receiving member 34, with the rod 37 being detachable therefrom.

The pressing member 38 includes a front/rear oriented rod 41 and a right/left oriented pressing tool 42. The rod 41 has its opposed ends bent to form hook-like engaging portions 41A engageable with the vertically oriented rods 36, 37 and has its intermediate portion inclined downward forwardly to form its front side lower than its rear side. The pressing tool 42 has an L-shape to come into face-contact with the front upper portion of the battery 19. And, as this pressing tool 42 is welded to the engaging portions 41A provided on the front side of the rod 41, at a front end portion of the pressing member 38, there is formed an insertion hole (not shown) allowing insertion of the front-side vertically oriented rod 36.

With the above-described arrangement, when the battery 19 is to be fixed on the deck of the support deck 31, for instance, firstly, the engaging portion 37B of the rear-side vertically oriented rod 37 will be introduced between the radiator 17 and the rear-side receiving member 34 and engaged with the engaging portion 34A of the rear-side receiving member 34, whereby the rear-side vertically oriented rod 37 will be held erect between the radiator 17 and the rear-side receiving member 34. Next, the battery 19 will be placed at a position of the support deck 31 which position is located between the front-side receiving member 33 and the rear-side receiving member 34. After this placing, the engaging portion 36B of the front-side vertically oriented rod 36 will be introduced between the holding mechanism 32 and the front-side receiving member 33 and engaged with the engaged portion 32A of the holding mechanism 32, whereby the front-side vertically oriented rod 36 will be held erect between the holding mechanism 32 and the front-side receiving member 33. Thereafter, the pressing member 38 will be fitted between the front-side vertically oriented rod 36 and the rear-side vertically oriented rod 37, with the pressing tool 42 of the pressing member 38 being placed in face contact with the front upper portion of the battery 19. After this fitting, firstly, the washer 39 will be fitted between the rear end of the pressing member 38 and the wing nut 40 and the wing nut 40 will be threaded to the threaded portion 37A of the rear-side vertically oriented rod 37, whereby the rear end portion of the pressing member 38 will be held at a position at a height spaced apart by an appropriate distance from the upper face of the battery 19. Next, the washer 39 will be fitted between the front end portion of the pressing member 38 and the wing nut 40, and the wing nut 40 will be threaded to the threaded portion 36A of the front-side vertically oriented rod 36, whereby the pressing tool 42 of the pressing member 38 will press the front upper portion of the battery 19. With these, the battery 19 can be fixed to the deck of the support deck 31.

On the other hand, when the battery 19 is to detached from the deck of the support deck 31, for instance, the wing nut 40 threaded to the threaded portion 36A of the front-side vertically oriented rod 36 will be loosened, thereby releasing the pressing on the front upper portion of the battery 19 by the pressing tool 42 of the pressing member 38. With this, the fixation of the battery 19 to the deck of the support deck 31 by the fixing tool 35 can be released. Also, the detachment of the front-side vertically oriented rod 36 and the pressing member 38 will now be possible. And, with detachment of these front-side vertically oriented rod 36 and the pressing member 38, it will now become possible to detach the battery 19 from the deck of the support deck 31.

Thereafter, when the battery 19 is to be fixed to the deck of the support deck 31, the battery 19 will be placed at the position of the support deck 31 which position is located between the front-side receiving member 33 and the rear-side receiving member 34. Then, firstly, the front-side vertically oriented rod 36 and the pressing member 38 will be attached between the upper end portion of the rear-side vertically oriented rod 37 and the engaged portion 32A of the holding mechanism 32, with the pressing tool 42 of the pressing member 38 being placed in face contact with the front upper portion of the battery 19. Thereafter, the wing nut 40 threaded to the threaded portion 36A of the front-side vertically oriented rod 36 will be loosened, and the front upper portion of the battery 19 will be pressed against the support deck 31 by the pressing tool 42 of the pressing member 38. With these, the battery 19 can be fixed to the deck of the support deck 31.

Figure 5:
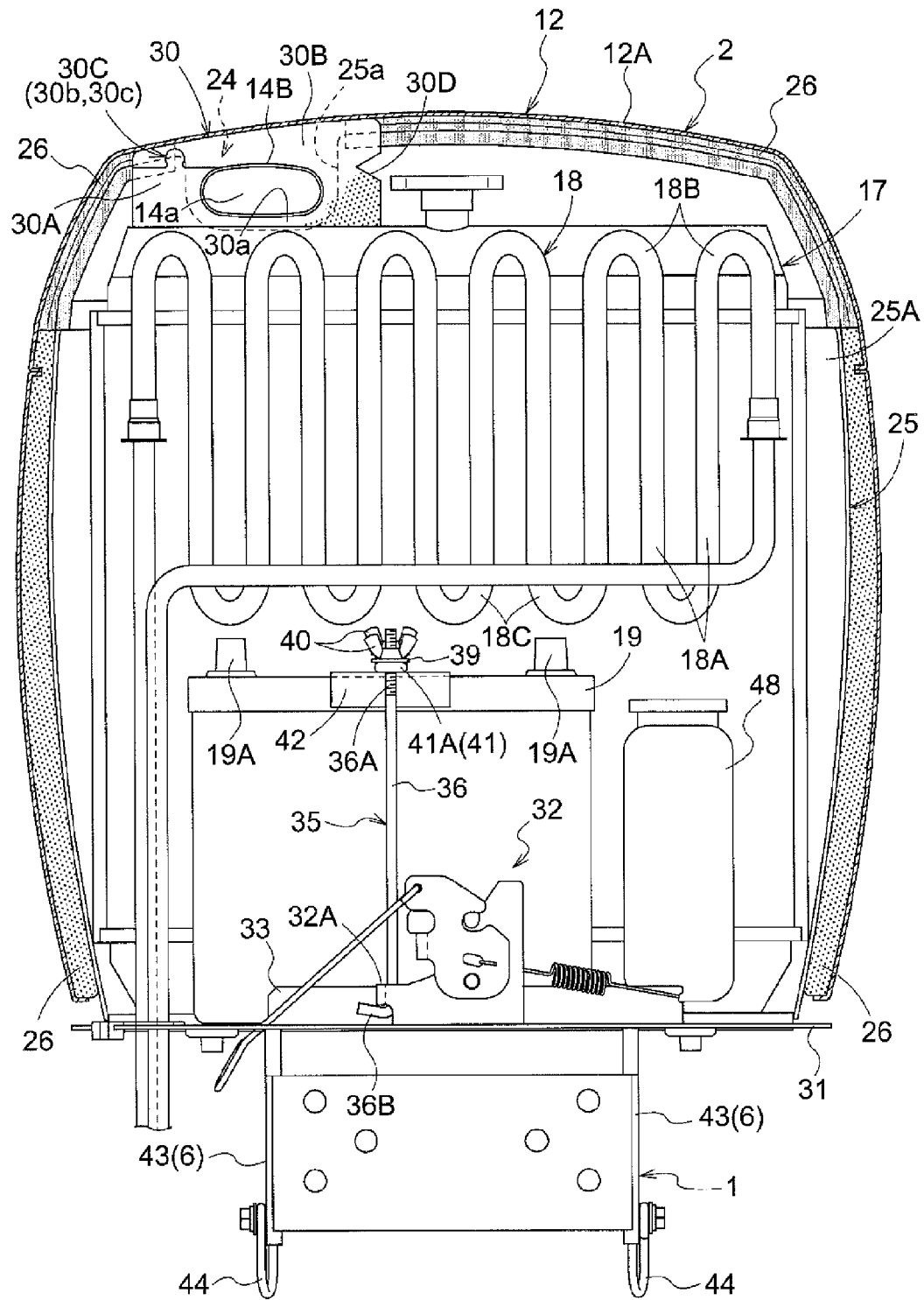
FIG. 5 is a front view in vertical section of the engine section showing a configuration and a layout of an elastic body.

As shown in FIGS. 3 through 5, the fixing tool 35 is disposed at a position not overlapped with the respective vertically oriented pipe portions 18A of the oil cooler 18 as viewed in the fore/aft direction of the vehicle body, i.e. as viewed in the flowing direction of cooling air and not overlapped with the respective lower pipe portions 18C of the oil cooler 18 as viewed in the plan view.

With the above-described arrangement, without needing to secure a space that allows mounting of the fixing tool 35 between the respective lower pipe portions 18C of the oil cooler 18 and the battery 19, the threading operation of the wing nut 40 to the threaded portion 37A of the rear-side vertically oriented rod 37 etc. can be carried out smoothly, without being interfered by the vertically oriented pipe portions 18A or the lower pipe portions 18C of the oil cooler 18. And, as there is no need for securing such space for mounting of the fixing tool between the oil cooler 18 and the battery 19, it is possible to avoid occurrence of such inconvenience that securing such space results in increase in the height of the hood 12, which in turn decreases the visibility to the front lower side of the vehicle body from the riding driving section 3 or in reduction in the length of the vertically oriented pipe portions 18A of the oil cooler 18 as well as reduction in the total length of the flow passage of this oil cooler 18, thus leading eventually to deterioration in the cooling efficiency for oil in the oil cooler 18 by cooling air from the front grill 12C.

As shown in FIGS. 3 through 5 and FIG. 9, the fixing tool 35 is disposed at a position spaced apart in the right/left direction from right and left terminals 19A provided in the upper portion of the battery 19 and not overlapped with a gas vent cap 19B as seen in the plan view. More specifically, the fixing tool 35 is disposed at the right/left center of the battery 19. With this arrangement, when the battery 19 is charged by an external power, it is possible to avoid inconvenience of terminals (not shown) connected to the right and left terminals 19A coming into contact with the fixing tool 35 inadvertently. Also, attaching/detaching operations of the gas vent gap 19B can be carried out smoothly, without being interfered by e.g. the pressing member 38 of the fixing tool 35.

Incidentally, though not shown, in case the battery 19 includes in its upper portion, the right and left terminals 19A and a plurality of liquid plugs, the fixing tool 35 may be disposed at a position spaced apart in the right/left direction from the right and left terminals 19A and not overlapped with the plurality of liquid plugs, for example, at the right/left center of the battery 19. With this arrangement, when the battery 19 is charged by an external power, it is possible to avoid inconvenience of terminals (not shown) connected to the right and left terminals 19A coming into contact with the fixing tool 35 inadvertently. Also, attaching/detaching operations of the respective liquid plugs can be carried out smoothly, without being interfered by e.g. the pressing member 38 of the fixing tool 35.

As shown in FIG. 2, FIG. 5, FIG. 11 and FIG. 12, the front frame 6 includes right and left side members 43 formed of band-like steel plates. Each side member 43 includes, at a lower end portion thereof, a hydraulic hose holder 44.

Each holder 44 is configured as a part formed of a round bar steel part bent in J-shape, which can be used in either right orientation or left orientation irrespectively. At its end spaced by a longer distance from its curved portion 44A, there is provided a loop-like connecting portion 44B enabling bolt-connection with the side member 43. And, when the connecting portion 44B is to be bolt-connected to the corresponding side member 43, an end face 44C opposite the connecting portion 44B will come into face-contact with a lower edge 43A of the corresponding side member 43, thus preventing co-rotation of each holder 44 in association with the threading operation at the time of bolt connecting. Further, when the connecting portions 44B are bolt-connected to the corresponding side members 43, their end faces 44C will come into contact with the lower edges 43A of the corresponding side members 43, so that their curved portion sides and the lower edges 43A of the side members 43 together form closed-loop like hose holding portions 45. And, with these hose holding portions 45, it is possible to hold appropriately a hydraulic hose 46 extending from e.g. a power steering unit (not shown).

That is, the right and left holders 44 are provided as parts made of round bar steel parts that can be used irrespectively of right/left orientation that can be readily maintained, and at the same time, the assembly efficiency of each holder can be improved and also the retention performance of the hydraulic hose 46 by each holder 44 can be enhanced as well.

Figure 8:
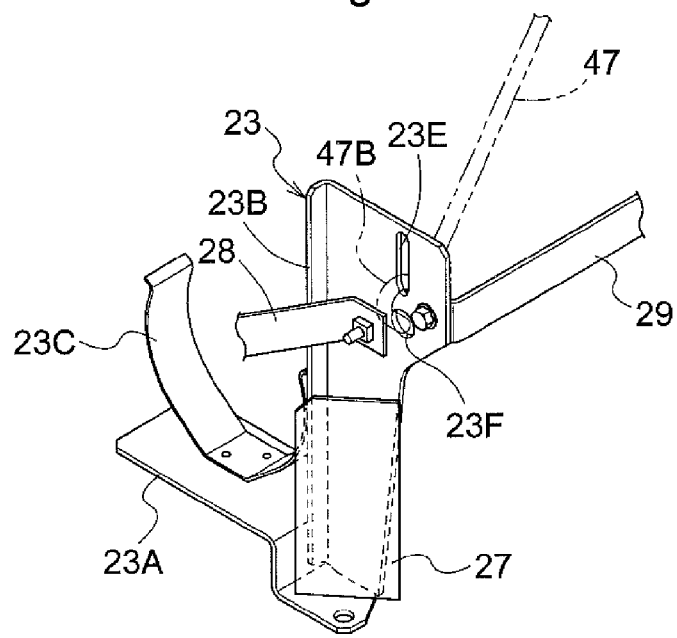
FIG. 8 is a perspective view of principal portions showing a configuration relating to a vane plate.
Figure 9:
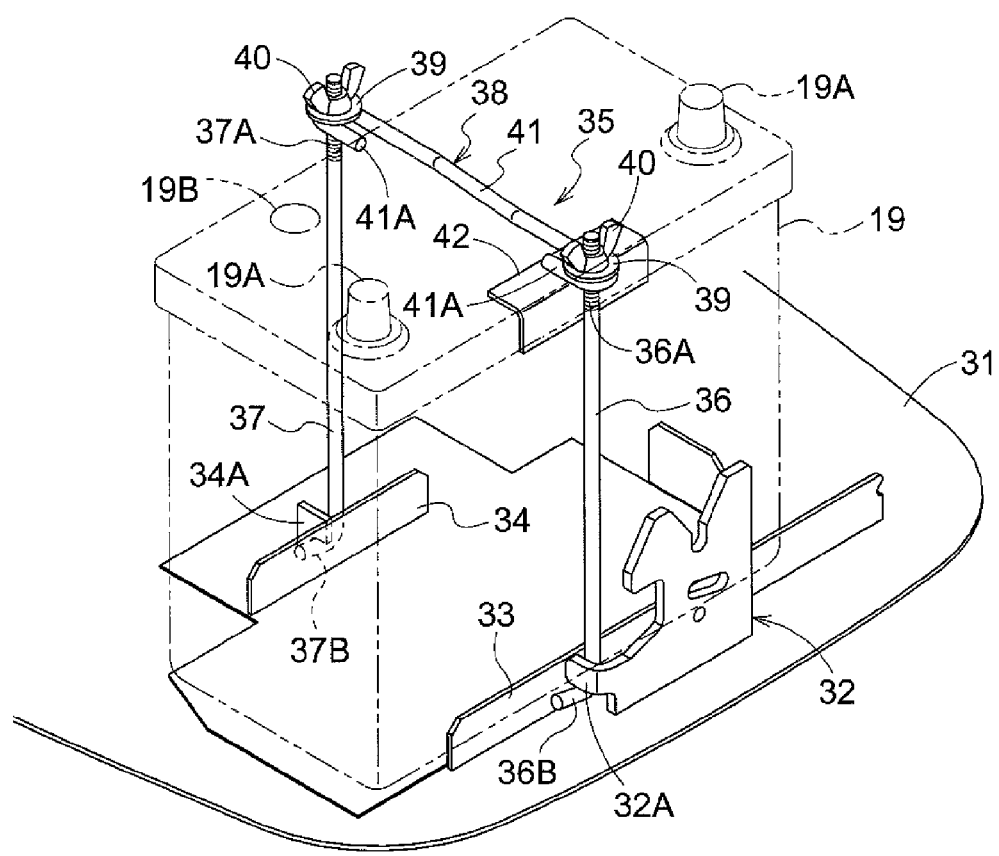
FIG. 9 is a perspective view of principal portions showing a support arrangement of a battery.
Figure 10A:
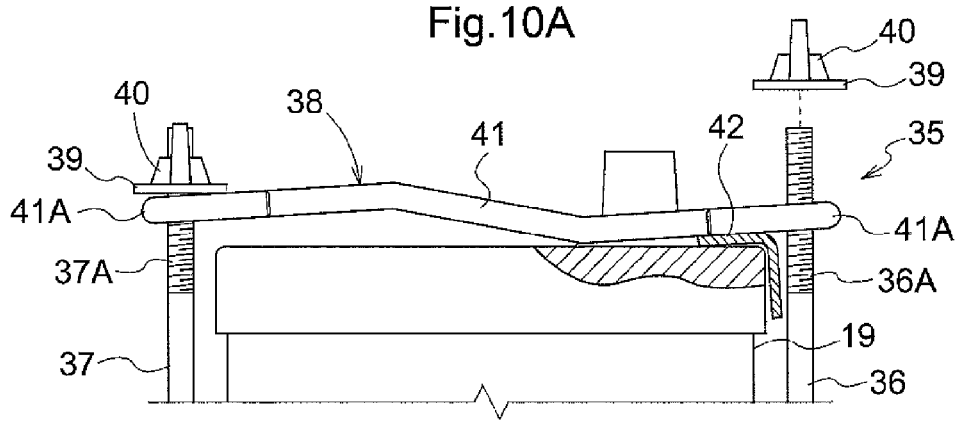
FIG. 10A is a right side view in vertical section illustrating a fixing procedure of the battery with using a fixing tool.
Figure 10B:
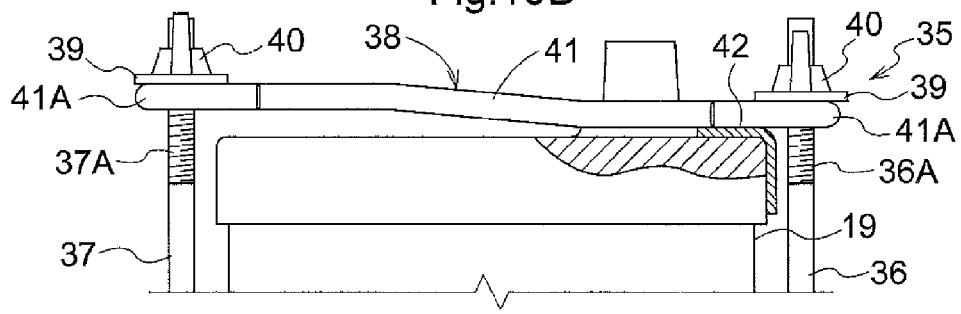
FIG. 10B is a further right side view in vertical section illustrating the fixing procedure of the battery with using the fixing tool.
Figure 11:
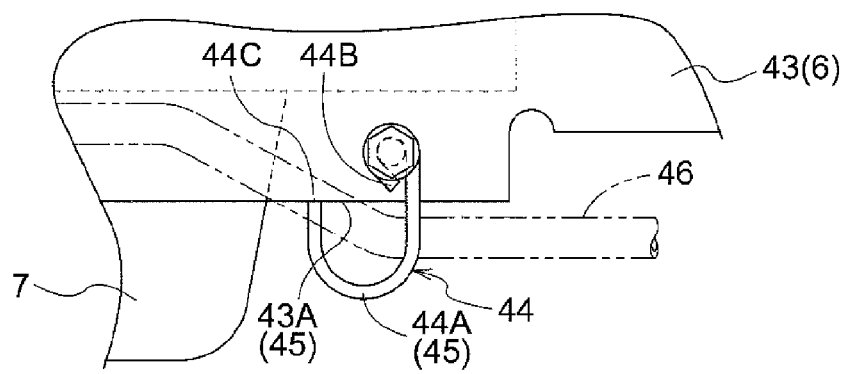
FIG. 11 is a right side view of principal portions illustrating a holder assembling condition of a hydraulic hose.
Figure 12:
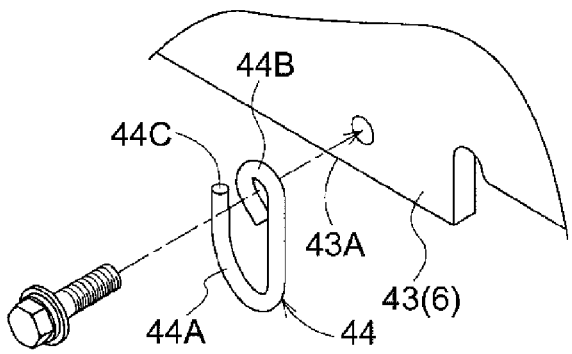
FIG. 12 is an exploded perspective view of principal portions showing the configuration of the holder for a hydraulic hose.

As shown in FIG. 2, FIG. 4 and FIG. 8, the hood 12 includes a front/rear oriented engaging portion 12E engageable with the holding mechanism 32 included in the support deck 31. Further, there is provided a support rod 47 which is vertically pivoted about a pivot portion 47A connected to its rear end. The support rod 47 has its free end side inserted into a vertically elongate insertion hole 23E formed in the raised portion 23B of the air cleaner support member 23 and has its free end portion bent to form a U-shaped engaging portion 47B engageable with the lower edge of the insertion hole 23E. And by means of a tension spring (not shown) extending from the second connecting member 29 to the support rod 47, the engaging portion 47B is urged to engage the lower edge of the insertion hole 23E. The raised portion 23B of the support member 23 has an engaging hole 23F downwardly of the insertion hole 23E.

With the above-described arrangement, when the hood 12 is pivotally lowered to be switched into its closed state, in association with this switchover to the closed state, the engaging portion 12E of the hood 12 will be engaged to and held by the holding mechanism 32, whereby the hood 12 can be fixedly maintained under this closed state.

Further, when the engaging/holding of the engaging portion 12E by the holding mechanism 32 is released and the hood 12 is pivotally lifted up, in association with this upward pivotal movement, the support rod 47 will be slidably displaced in a withdrawing direction relative to the insertion hole 23E, with its state contacting the lower edge of the insertion hole 23E being maintained by the tension spring. And, the engaging portion 47B of the support rod 47 will reach the lower edge of the insertion hole 23E and also the free end of the support rod 47 will engage into the engaging hole 23F and the engaging portion 47B will engage the lower edge of the insertion hole 23E. With this, the hood 12 can be fixedly maintained under a predetermined opened state.

And, this fixed maintenance of the hood 12 under the opened state can be released by releasing the engagement of the engaging portion 47B to the lower edge of the insertion hole 23E against the effect of the tension spring, whereby switchover of the hood 12 to the closed state by its downward pivotal movement can now be allowed.

As shown in FIGS. 3 through 5, at a position on the left side of the battery 19 and on the front side of the radiator 17, there is mounted a reservoir tank 48 for the radiator. Like the battery 19 described above, with effective utilization of the space made available downwardly of the oil cooler 18 by disposing this oil cooler 18 in opposition to the upper half portion of the radiator 17, the reservoir tank 48 is disposed in opposition to the lower half portion of the radiator 17, with the tank 48 being inserted under the oil cooler 18 to be overlapped with this oil cooler 18 as viewed in the plan view.

Other Embodiments

[1] The hood 12 can be configured such that its first cover portion 12A, like the right and left second cover portions 12B, is detachably attachable or that the first cover portion 12A and the right and left second cover portions 12B are pivotally opened/closed together in the vertical direction or attached/detached together.

[2] The air cleaner 14 can be disposed on the upstream side (vehicle body front side) in the flowing direction of cooling air to the radiator 17 in the engine room, so that the relaying intake pipe 14C extending from this air cleaner 14 to the intake portion 7A of the engine 7 extends through the space 24 formed between the hood 12 and the radiator 17.

[3] The forming position of the space 24 for intake pipe passage in the engine section 2 can vary in many ways as long as it is formed between the hood 12 and the radiator 17. For instance, the intake pipe passing space 24 can be formed between the hood 12 and the left upper portion of the radiator 17. Further alternatively, the intake pipe passing space 24 can be formed between the hood 12 and the left side portion of the radiator 17.

[4] The radiator 17 can include right and left sponge-like seal members for closing the gap between the hood 12 and the radiator 17, with a predetermined spacing therebetween, thus securing the space 24 for allowing passage of the ambient introducing intake pipe 14B or the relaying intake pipe 14C between these right and left sealing members.

[5] The elastic body 30 can be configured such that the radiator side elastic portion 30A and the hood side elastic portion 30B are detachable from each other. In the case of this configuration, it is conceivable to arrange such that the engaging portion 30C is provided in each detachable portion of the radiator side elastic portion 30A and of the hood side elastic portion 30B located on the opposed adjacent sides of the concave portion 30a of the elastic body 30, so that these engaging portions 30C may engage and maintain the hood side elastic portion 30b under the closed state.

Figure 13A:
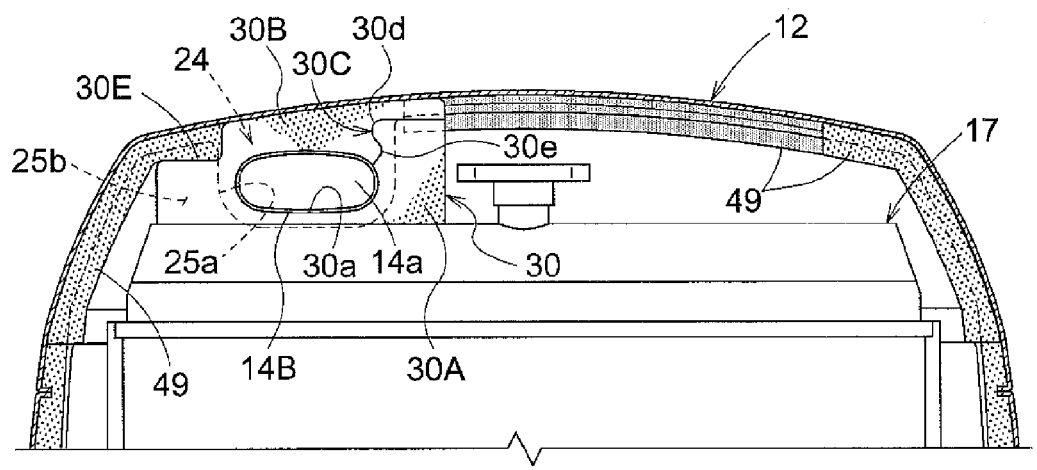
FIG. 13A is a front view in vertical section showing an engine section upper portion illustrating a configuration of an elastic body according to a further embodiment (6)
Figure 13B:
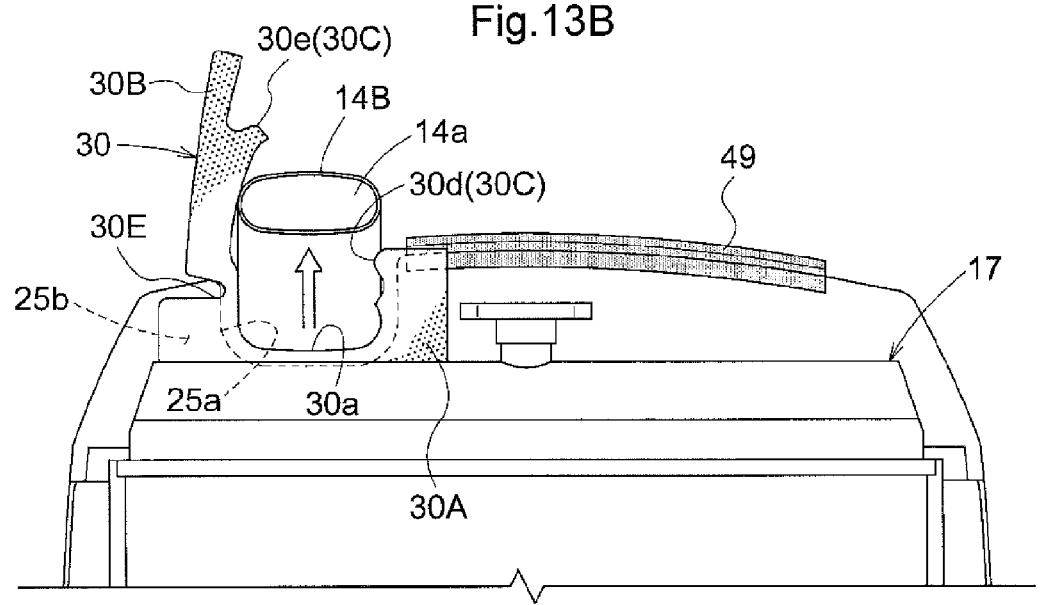
FIG. 13B is a further front view in vertical section showing the engine section upper portion illustrating the configuration of the elastic body according to the further embodiment (6).

[6] The elastic body 30 can be alternatively configured as shown in FIG. 13A and FIG. 13B. More specifically, the elastic body 30 shown in FIG. 13A and FIG. 13B includes: a radiator side elastic portion (an example of "first elastic portion") 30A to be fixed to the radiator side; a hood side elastic portion (an example of "second elastic portion") 30B which can be opened/closed to a closed state (engaged state) for surrounding the ambient air introducing intake pipe 14B together with the radiator side elastic portion 30A, and an opened state (engagement released state) for opening up the ambient air introducing intake pipe 14B to the outside; and an engaging portion 30C for engaging/maintaining the hood side elastic portion 30B under the closed state.

FIG. 13A is a front view in vertical section showing an engine section upper portion illustrating the hood side elastic portion 30B being under the closed state (engaged state).

Figure 6:
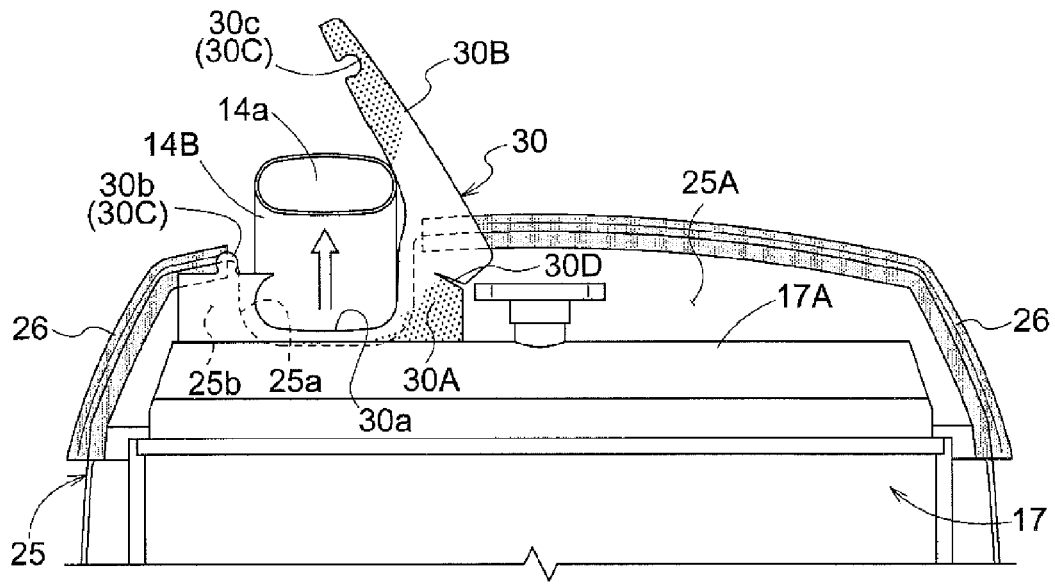
FIG. 6 is a front view in vertical section of principal portions illustrating an opened state of a hood side elastic portion of the elastic body.

FIG. 13B is a front view in vertical section showing the engine section upper portion illustrating the hood side elastic portion 30B being under the opened state (engagement released state). In FIG. 13B, for clarity of illustration of the elastic body 30, like FIG. 6, illustration of the hood 12 under the opened state is omitted.

The radiator side elastic portion 30A has a U-shape having a concave portion 30a which is smaller than the recessed part 25a of the fan shroud 25. And, the radiator side elastic portion 30A is fixed as being bonded to a circumferential portion 25b of the recessed part 25a in the extension portion front end face of the fan shroud 25.

The hood side elastic portion 30B is formed integral with the radiator side elastic portion 30A to be capable of pivotally opening/closing. And, a cutout portion 30E is formed at an outer portion of the right end bridging between the radiator side elastic portion 30A and the hood side elastic portion 30B, thus allowing smooth pivotal switchover from the closed state to the opened state without inviting pivotal deformation. Further, elasticity of the hood side elastic portion 30B aids returning from the opened state to the closed state. And, under the closed state of the hood side elastic portion 30B, the hood side elastic portion 30B, in cooperation with the radiator side elastic portion 30A, is fitted on the ambient air introducing intake pipe 14B in tight contact with the intake pipe 14B. Further, as the ambient air introducing intake pipe 14B extends between the right and left trimmed portions 26 disposed on the right and left sides thereof, the ambient air introducing intake pipe 14B functions as a sealing member for sealing/closing a gap relative to the hood 12 under its closed state.

The engaging portion 30C is comprised of: a first projecting part 30d which projects in a direction perpendicular to the opening/closing direction of the hood side elastic portion 30B and also to the inserting direction of the intake pipe 14B from the radiator side elastic portion 30A toward the hood side elastic portion 30B (the right/left direction of vehicle body in FIG. 13A, 13B); and a second projecting part 30e which projects in the direction perpendicular to the opening/closing direction of the hood side elastic portion 30B and also to the inserting direction of the intake pipe 14B from the hood side elastic portion 30B toward the radiator side elastic portion 30A (the right/left direction of vehicle body in FIG. 13A, 13B). And, the first projecting part 30d and the second projecting part 30e are disposed with offset relative to each other in the opening/closing direction of the hood side elastic portion 30B so that the second projecting part 30e may extend to the downstream side in the closing direction of the hood side elastic portion 30B relative to the first projecting part 30d, under the closed state of the hood side elastic portion 30B.

Incidentally, in the above-described configuration, the arrangement that "the second projecting part 30e may extend to the downstream side in the closing direction of the hood side elastic portion 30B relative to the first projecting part 30d" may be replaced by an alternative arrangement of the second projecting part 30e extending into a gap between the first projecting part 30d and the ambient air introducing intake pipe 14B or the relaying intake pipe 14C; or a further alternative arrangement of the second projecting part 30e extending into a gap between the first projecting part 30d, and a portion of the radiator side elastic portion 30A which is more downstream side in the closing direction of the hood side elastic portion 30B than the first projecting part 30d in the radiator side elastic portion 30A.

Incidentally, in FIG. 13, the hood side elastic portion 30B is formed integral with the radiator side elastic portion 30A to be pivotally opened/closed. Instead, the radiator side elastic portion 30A and the hood side elastic portion 30B may be configured to be detachable from each other, and engaging portions 30C may be provided at respective detachable portion of the radiator side elastic portion 30A and the hood side elastic portion 30B disposed on opposed adjacent sides of the concave portion 30a in the elastic body 30, such that these engaging portions 30C may engage and maintain the hood side elastic portion 30B under its closed state.

[7] The configuration of the engaging portion 30C of the elastic body 30 can vary in many ways other than those illustrated in the foregoing embodiment and the further embodiment [6] above. For instance, the engaging portion 30C can be configured as a separate member which is detachably attached to the radiator side elastic portion 30A and the hood side elastic portion 30B. Further alternatively, the engaging portion 30C can be provided as a hook-like engaging part included in the radiator side elastic portion 30A and the hood side elastic portion 30B, respectively.

[8] The radiator side elastic portion 30A of the elastic body 30 can be fixed to the rear face of the extension portion 25A of the fan shroud 25 or can be fixed to the front face, the rear face or the upper face of the radiator 17. Still further alternatively, there may be provided a support member dedicated for the radiator side elastic portion.

[9] In the foregoing embodiment, a tractor was shown as an example of the work vehicle. It is understood, however, that the invention is not limited thereto. For instance, the present invention is applicable also to other work vehicles such as a tractor, a riding grass mower, a riding rice planter, a riding direct sowing machine, a combine, a wheeled loader, a backhoe, etc. having an air cleaner including an intake pipe extending through a space formed between an openable/closable hood and a radiator.

What is claimed is:

1. A work vehicle comprising:
a vehicle body frame;
an engine and a radiator which are mounted on the vehicle body frame;
a hood switchable between a closed state for covering the engine and the radiator and an opened state for opening the engine and the radiator to the outside;

an air cleaner having an intake pipe, the intake pipe extending through a space formed between the hood and the radiator when the hood is under the closed state; and an elastic body closing a gap around the intake pipe in said space when the hood is under the closed state;

wherein the elastic body includes:
a first elastic portion fixed to the radiator,
a second elastic portion disposed closer to the hood than the first elastic portion, the second elastic portion being switchable between an engaged state in which the second elastic portion surrounds the intake pipe in cooperation with the first elastic portion and an engagement released state in which the intake pipe is opened to the outside, and
an engaging portion for engaging and maintaining the second elastic portion under the engaged state;
wherein under the closed state of the hood, the engaging portion maintains the second elastic portion under the engaged state, and the elastic body maintains the intake pipe at a predetermined position and closes said gap; and
wherein the first elastic portion and the second elastic portion are formed integrally with each other such that the elastic body may be opened/closed.

2. The work vehicle according to claim 1, wherein:
the engaging portion includes a first projecting part which projects from the first elastic portion toward the second elastic portion in a direction perpendicular to an opening/closing direction of the second elastic portion and an inserting direction of the intake pipe, and a second projecting part which projects from the second elastic portion toward the first elastic portion in the direction perpendicular to the opening/closing direction of the second elastic portion and the inserting direction of the intake pipe;
the first projecting part and the second projecting part are offset in position in the opening/closing direction of the second elastic portion; and
when the second elastic portion is under the engaged state, the second projecting part projects more on downstream side than the first projecting part in the closing direction of the second elastic portion.

3. The work vehicle according to claim 1, wherein the engaging portion includes a convex portion formed in one of the first elastic portion and the second elastic portion and a concave portion formed in the other one of the first elastic portion and the second elastic portion.

4. The work vehicle according to claim 1, further comprising:
a cooling fan; and
a fan shroud extending from the radiator to the cooling fan;
wherein the fan shroud includes an extension portion extending from the radiator to the hood, the extension portion having a recessed part forming said space between the extension portion and the hood; and
the first elastic portion of the elastic body is fixed to a circumferential portion of the recessed part in the fan shroud.

5. A work vehicle comprising:
a vehicle body frame;
an engine and a radiator which are mounted on the vehicle body frame;
a hood switchable between a closed state for covering the engine and the radiator and an opened state for opening the engine and the radiator to the outside;

an air cleaner having an intake pipe, the intake pipe extending through a space formed between the hood and the radiator when the hood is under the closed state; and an elastic body closing a gap around the intake pipe in said space when the hood is under the closed state;

wherein the elastic body includes:
a first elastic portion fixed to the radiator,
a second elastic portion disposed closer to the hood than the first elastic portion, the second elastic portion being switchable between an engaged state in which the second elastic portion surrounds the intake pipe in cooperation with the first elastic portion and an engagement released state in which the intake pipe is opened to the outside, and
an engaging portion for engaging and maintaining the second elastic portion under the engaged state;
wherein under the closed state of the hood, the engaging portion maintains the second elastic portion under the engaged state, and the elastic body maintains the intake pipe at a predetermined position and closes said gap; and
wherein the engaging portion includes a first projecting part which projects from the first elastic portion toward the second elastic portion in a direction perpendicular to an opening/closing direction of the second elastic portion and an inserting direction of the intake pipe, and a second projecting part which projects from the second elastic portion toward the first elastic portion in the direction perpendicular to the opening/closing direction of the second elastic portion and the inserting direction of the intake pipe;
the first projecting part and the second projecting part are offset in position in the opening/closing direction of the second elastic portion; and
when the second elastic portion is under the engaged state, the second projecting part projects more on the downstream side than the first projecting part in the closing direction of the second elastic portion.

6. A work vehicle comprising:
a vehicle body frame;
an engine and a radiator which are mounted on the vehicle body frame;
a hood switchable between a closed state for covering the engine and the radiator and an opened state for opening the engine and the radiator to the outside;
an air cleaner having an intake pipe, the intake pipe extending through a space formed between the hood and the radiator when the hood is under the closed state; and
an elastic body closing a gap around the intake pipe in said space when the hood is under the closed state;
wherein the elastic body includes:
a first elastic portion fixed to the radiator,
a second elastic portion disposed closer to the hood than the first elastic portion, the second elastic portion being switchable between an engaged state in which the second elastic portion surrounds the intake pipe in cooperation with the first elastic portion and an engagement released state in which the intake pipe is opened to the outside, and
an engaging portion for engaging and maintaining the second elastic portion under the engaged state;
wherein under the closed state of the hood, the engaging portion maintains the second elastic portion under the engaged state, and the elastic body maintains the intake pipe at a predetermined position and closes said gap; and wherein the engaging portion includes a convex portion formed in one of the first elastic portion and the second elastic portion and a concave portion formed in the other one of the first elastic portion and the second elastic portion.

7. A work vehicle comprising:
a vehicle body frame;
an engine and a radiator which are mounted on the vehicle body frame;
a hood switchable between a closed state for covering the engine and the radiator and an opened state for opening the engine and the radiator to the outside;
an air cleaner having an intake pipe, the intake pipe extending through a space formed between the hood and the radiator when the hood is under the closed state;
an elastic body closing a gap around the intake pipe in said space when the hood is under the closed state;
a cooling fan; and
a fan shroud extending from the radiator to the cooling fan;

wherein the elastic body includes:
a first elastic portion fixed to the radiator,
a second elastic portion disposed closer to the hood than the first elastic portion, the second elastic portion being switchable between an engaged state in which the second elastic portion surrounds the intake pipe in cooperation with the first elastic portion and an engagement released state in which the intake pipe is opened to the outside, and
an engaging portion for engaging and maintaining the second elastic portion under the engaged state;
wherein under the closed state of the hood, the engaging portion maintains the second elastic portion under the engaged state, and the elastic body maintains the intake pipe at a predetermined position and closes said gap; and
wherein the fan shroud includes an extension portion extending from the radiator to the hood, the extension portion having a recessed part forming said space between the extension portion and the hood; and
the first elastic portion of the elastic body is fixed to a circumferential portion of the recessed part in the fan shroud.

* * * * *